US006999977B1

(12) United States Patent
Norcott et al.

(10) Patent No.: US 6,999,977 B1
(45) Date of Patent: Feb. 14, 2006

(54) METHOD AND APPARATUS FOR CHANGE DATA CAPTURE IN A DATABASE SYSTEM

(75) Inventors: William D. Norcott, Hollis, NH (US); Michael Brey, Monument, CO (US); John Galanes, Billerica, MA (US); Paula Bingham, Westford, MA (US); Raymond Guzman, Amherst, NH (US)

(73) Assignee: Oracle International Corp, Redwood Shores, CA (US)

( * ) Notice: Subject to any disclaimer, the term of this patent is extended or adjusted under 35 U.S.C. 154(b) by 385 days.

(21) Appl. No.: 10/140,818

(22) Filed: May 9, 2002

(51) Int. Cl.
*G06F 17/30* (2006.01)

(52) U.S. Cl. ..................... 707/203; 707/102

(58) Field of Classification Search .............. 707/1–10, 707/100–104.1, 200–205; 705/35–37
See application file for complete search history.

(56) References Cited

U.S. PATENT DOCUMENTS

| | | | |
|---|---|---|---|
| 5,280,612 A | 1/1994 | Lorie et al. | |
| 5,553,279 A | 9/1996 | Goldring | |
| 5,603,024 A | 2/1997 | Goldring | |
| 5,848,405 A | 12/1998 | Norcott | |
| 5,890,140 A * | 3/1999 | Clark et al. ................... | 705/35 |
| 5,926,819 A | 7/1999 | Doo et al. | |
| 5,963,959 A | 10/1999 | Sun et al. | |
| 6,125,360 A | 9/2000 | Witkowski et al. | |
| 6,438,538 B1 | 8/2002 | Goldring | |

2003/0172091 A1  9/2003  Norcott

FOREIGN PATENT DOCUMENTS

WO   WO/02/095632 A2   11/2002
WO   WO/03/096227 A2   11/2003

OTHER PUBLICATIONS

U.S. Appl. No. 09/863,419, filed May 24, 2001, Norcott.
Bello R G et al; "Materialized views in Oracle"; Proceedings of the Twenty-Fourth International Conference on Very-Large Databases; New York, NY; Aug. 24-27, 1998; pp. 659-664; Kaufmann Publishers Inc; USA.
Chaudhuri S et al; "An Overview of Data Warehousing and OLAP Technology"; Mar. 1997; pp. 65-74; vol. 26, No. 1; Sigmod Record; New York, NY; USA.
Gall W et al; "Moving time window aggregates over patient histories"; International Journal of Medical Informatics; Oct. 2001, vol. 63, No. 3, pp. 133-145, XP004299476, ISSN: 1386-5056, abstract, p. 135, left-hand column, line 1-page 136, right-hand colomn, line 2, Elsevier Scientific Publishers, Shannon, IR; Vienna, Austria.

* cited by examiner

*Primary Examiner*—Mohammad Ali
(74) *Attorney, Agent, or Firm*—Swidler Berlin LLP

(57) ABSTRACT

A method of change data captured is disclosed, in which modifications made to on-line transaction processing (OLTP) tables (e.g. inserts, updates, and deletes) are maintained in a database object, referred to as a change table. The change data in the change table is then made available to analysis applications in a controlled manner, such as in accordance with a publication-subscription model.

18 Claims, 5 Drawing Sheets

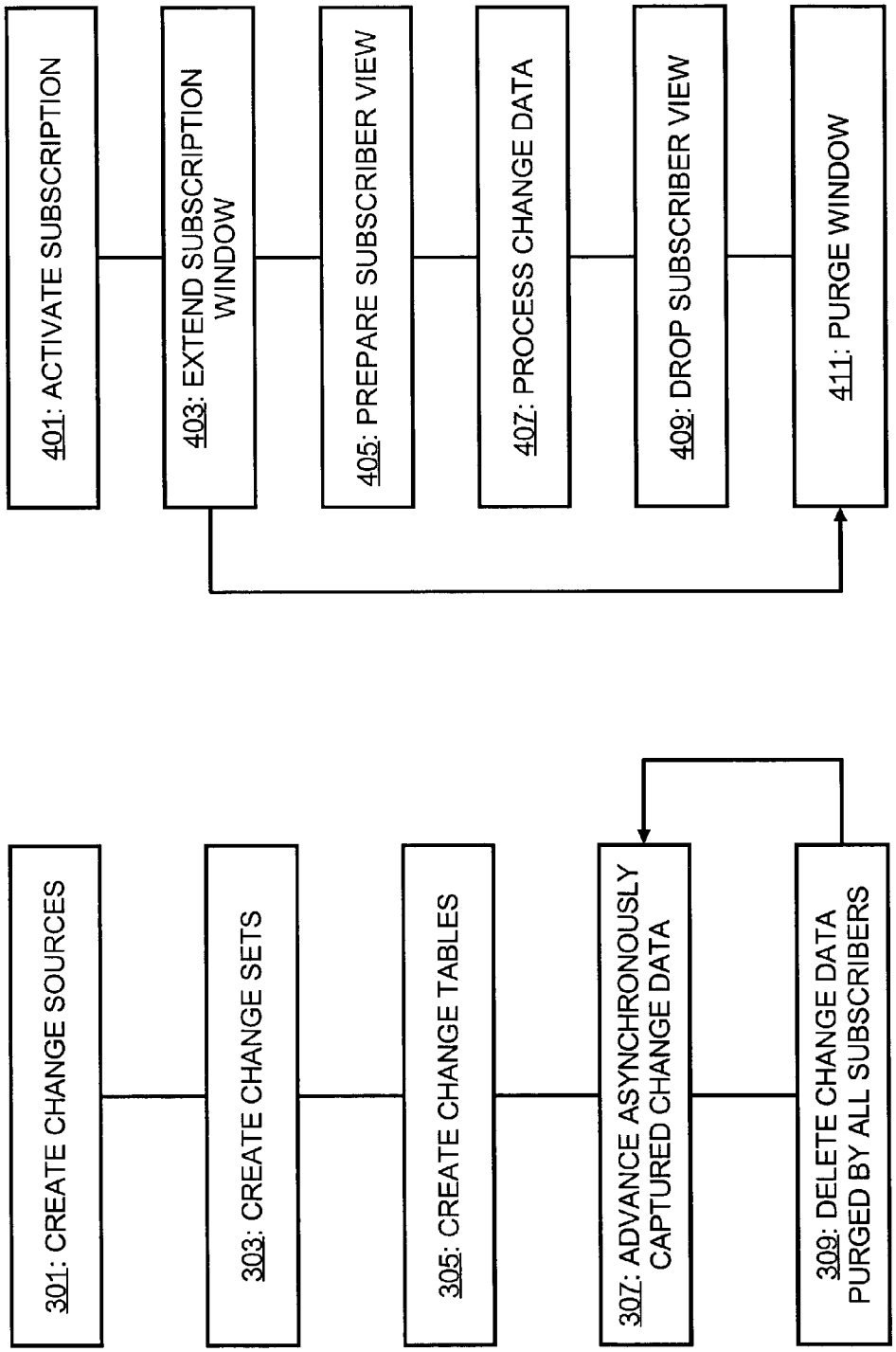

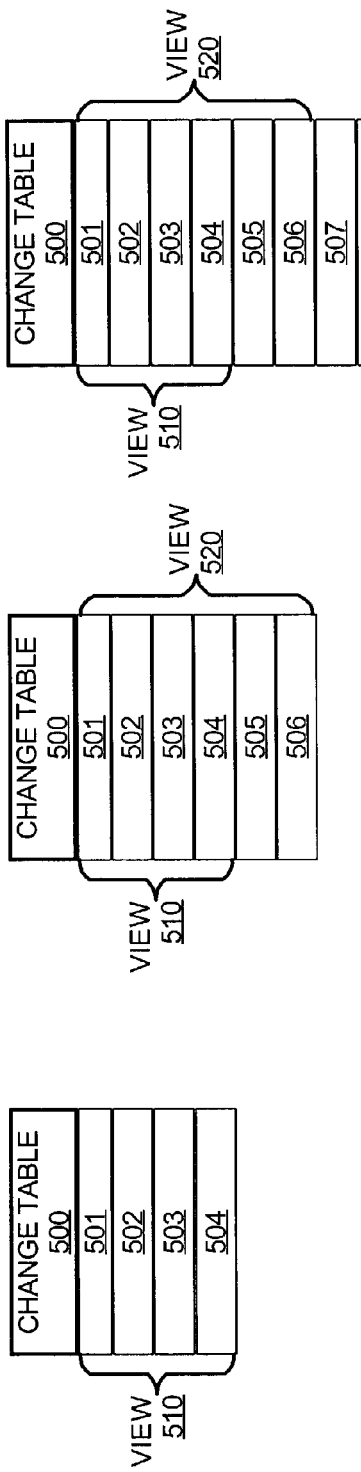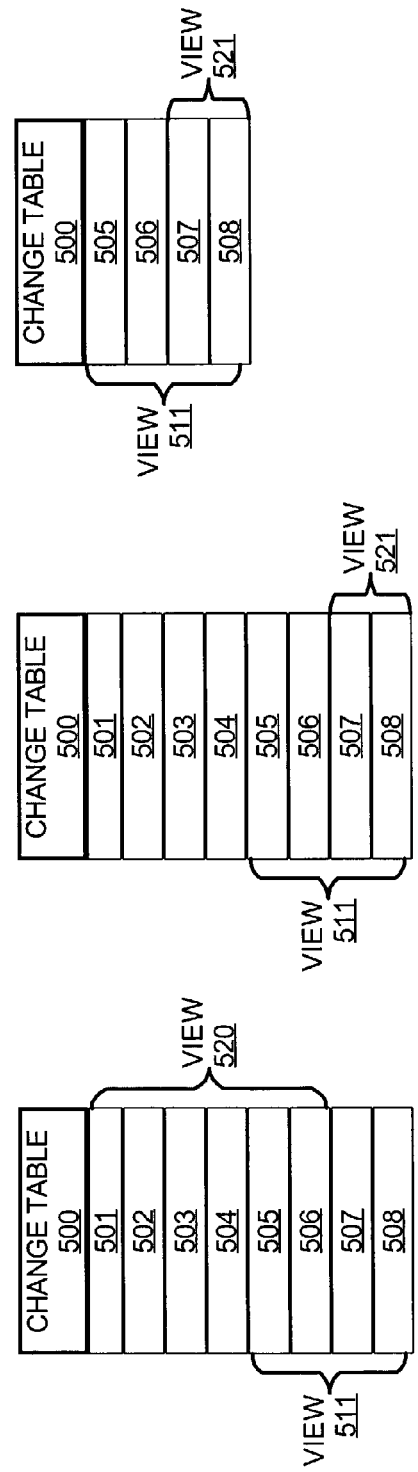

METHOD AND APPARATUS FOR CHANGE DATA CAPTURE IN A DATABASE SYSTEM

RELATED APPLICATIONS

The present application is related to U.S. patent application Ser. No. 09/863,419 entitled "Asynchronous Change Capture for Data Warehousing" filed on May 24, 2001 by William D. Norcott, the contents of which are hereby incorporated by reference.

The present application is related to U.S. patent application Ser. No. 09/863,422 entitled "Synchronous Change Data Capture in a Relational Database" filed on May 24, 2001 by William D. Norcott, the contents of which are hereby incorporated by reference.

FIELD OF THE INVENTION

The present invention relates to database systems and more particularly to a method and apparatus for change data capture in a database system.

BACKGROUND OF THE INVENTION

Many businesses and other large organizations today use relational database management systems to execute and keep track of business transactions. These systems are known as on-line transaction processing (OLTP) systems. For example, a company that sells products or services over the Internet may use an OLTP system to record pricing information about each product for sale, billing and shipping information for each purchaser, and sales information for each order made by a purchaser. Other examples of businesses that use OLTP systems include airlines, banks, mail-order companies, supermarkets, and manufacturers. The performance of OLTP systems, e.g. the number of transactions per second, is vitally important for businesses, and it is therefore desirable not to degrade the performance of OLTP systems unless absolutely necessary.

The data generated and recorded in OLTP systems are valuable to most businesses, because the businesses can aggregate and analyze the data to ascertain the product sales for a particular month, forecast changing trends in product popularity and identify profitable or unprofitable product lines, or otherwise evaluate the businesses' affairs. Aggregating and analyzing this data, however, is computationally expensive and, if performed on the OLTP system itself, would decrease the performance of the OLTP system. Accordingly, it has become common for businesses with OLTP systems to set up a separate computer system, generally known as a "data warehouse," for the purpose of collecting, aggregating, and analyzing the information contained in the OLTP databases. Data warehouses can grow very large, ranging from gigabytes to many terabytes of data (trillions of bytes). The task of moving data from its original source in OLTP systems to the data warehouse is commonly referred to as data extraction, transport, and loading (ETL).

Conventional data extraction, transport, and loading mechanisms are cumbersome. In a typical approach, database administrators generally dump the entire contents of the tables in the OLTP system into flat files, transport the flat files to a staging system, and then load the data in the flat files into the data warehouse. In this approach, the amount of data extracted, transported, and loaded is as immense as the amount of data in the OLTP system, even though only a small percentage of the data on the OLTP system is actually new. Accordingly, there has been much interest in devising ways to reduce the amount of data extracted, transported, and loaded by capturing only the changed data to the database tables of the OLTP system.

A typical approach for capturing the changed data to OLTP system database tables is to add a column to the OLTP system database tables to store a timestamp or a sequence number and conditionally extract the data that has the newest timestamps or sequence numbers. This approach has several disadvantages. First, this approach requires a change to the schema, e.g. adding the extra column to hold the timestamp to track the changes. Not only is this schema change an administrative nightmare, many vendors of OLTP systems forbid their customers from making any changes to the schema for security, maintenance, and liability reasons.

Second, there is a performance hit in storing the timestamp for every row of new or changed data, yet performance is critical for OLTP systems. Third, while timestamps can easily identify which rows have changed due to an insert or update, timestamps cannot distinguish between a newly inserted row or an old row that was updated. Furthermore, timestamps cannot identify deleted rows, because deleted rows are no longer present in the database. The lack of this kind of change information makes it difficult to properly update summaries of the OLTP data, resulting in expensive recalculations of the summary data.

The conventional flat file approach is also disadvantageous for data transport. Flat files are outside the control of the database management system. Thus, flat files cannot take advantage of the sophisticated file management functions provided by modern database management systems, such as crash recovery for robust data protection and data partitioning and indexing for efficient data processing. Consequently, storing the changed data in flat files increases the risk that data will be lost or corrupted and greatly complicates the task of joining or combining the changed data with the data that is stored in the data warehouse for use by the data analysis applications.

In terms of data loading, the conventional flat file approach also suffers from data loss and double counting. In the flat file approach, there is no coordination between the process that updates the flat file with additional changed data and the applications that consume and analyze the changed data. When the flat file grows too large for the data warehouse system, the system administrator is likely to delete the oldest data in the flat file arbitrarily. If a data analysis application has not yet processed the deleted data, that data is permanently lost to the application, resulting in inaccurate summaries of the OLTP data. On the other hand, if the data analysis application needs to make multiple passes on the flat file to process the data, the data analysis application cannot identify the data that has been newly added to the flat file. Typically, the data analysis application is forced to reprocess all the data in the flat file, resulting in double counting of the old data.

Therefore, there is a need for data extraction, transport, and loading techniques that are efficient, do not require schema changes, are robust, and do not suffer from data loss or double counting problems.

SUMMARY OF THE INVENTION

The present invention addresses these and other needs by capturing modifications made to OLTP tables (e.g. inserts, updates, and deletes) in a database object, referred to as a change table. The change data in the change table is then made available to analysis applications in a controlled manner, for example, in accordance with a publication-subscription model, to prevent loss or double counting of the change data.

In one publication-subscription model, publication includes the creation and maintenance of change tables. In a preferred embodiment, a change table is a database object on the data warehouse that contains the change data for a corresponding "source table" on the OLTP system. Change tables may be logically grouped into "change sets" for transactional consistency and are loaded from time to time with new change data extracted from the corresponding source tables on the OLTP system. To prevent change tables from growing without limit as well as to address the data loss problem, the contents of the change tables are only deleted when the contents are no longer needed by any of the subscribers.

Subscription includes a mechanism for an analysis application to request access to the change data in the change tables in a manner such that the change data is retrieved with no data loss or double counting. Specifically, change data is only deleted from the change tables when all of the subscriber applications indicate that the change data is no longer needed (e.g. because the change data has been processed). Furthermore, double counting is avoided by only providing new change data to a subscriber in response to a request for new change data. Thus a subscriber is capable of rereading the same rows of the change table as often as needed without regard to the new changes that are being captured and loaded into the change table.

Accordingly, one aspect of the invention relates to a method and software for managing change data captured from a database system by maintaining a database object that corresponds to a source object of the database system. This database object contains change data that indicates at least one modification (e.g. an insert, a delete, or an update) that has been performed on the source object. With respect to an application, a window of change data is defined to include all the change data in the database object that was committed between a first point in time and a second point in time. The first and second points in time may be defined with respect to a physical time of date (e.g. 12:00 noon on Jul. 14, 2000) or to a logical time (e.g. at system change number 123423, where each operation on the database system is marked with a monotonically increasing system change number). The window can be extended by moving the second point in time forward or purged by the first point in time to be coincident with the second point in time. In response to a query from the application, only the change data from the database object that is included in the window is presented to the application. New change data from the source object may be added to the database object; however, that new change data will only be presented to the application after extending the window.

In various embodiments, the database object can be implemented as a change table, and the change table can be associated with a group of change tables referred to herein as a "change set." The change set can be maintained for transactional consistency and such that each of the change tables in the change set includes change data only within a defined period of time such as June 2001. The same source object on the database system can be associated with multiple change tables in different change sets. Furthermore, multiple applications can define their respective windows on the same database object, each window of which can be for a different range of change data.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flowchart that illustrates various publication operations for an embodiment of the present invention.

FIG. 4 is flowchart that illustrates various subscription operations for an embodiment of the present invention.

FIGS. 5A, 5B, 5C, 5D, 5E, and 5F show various states of a change table in accordance with a working example of an embodiment of the present invention.

DESCRIPTION OF THE PREFERRED EMBODIMENT

A system, method, and software for change data capture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Architectural Overview

Figure 1:
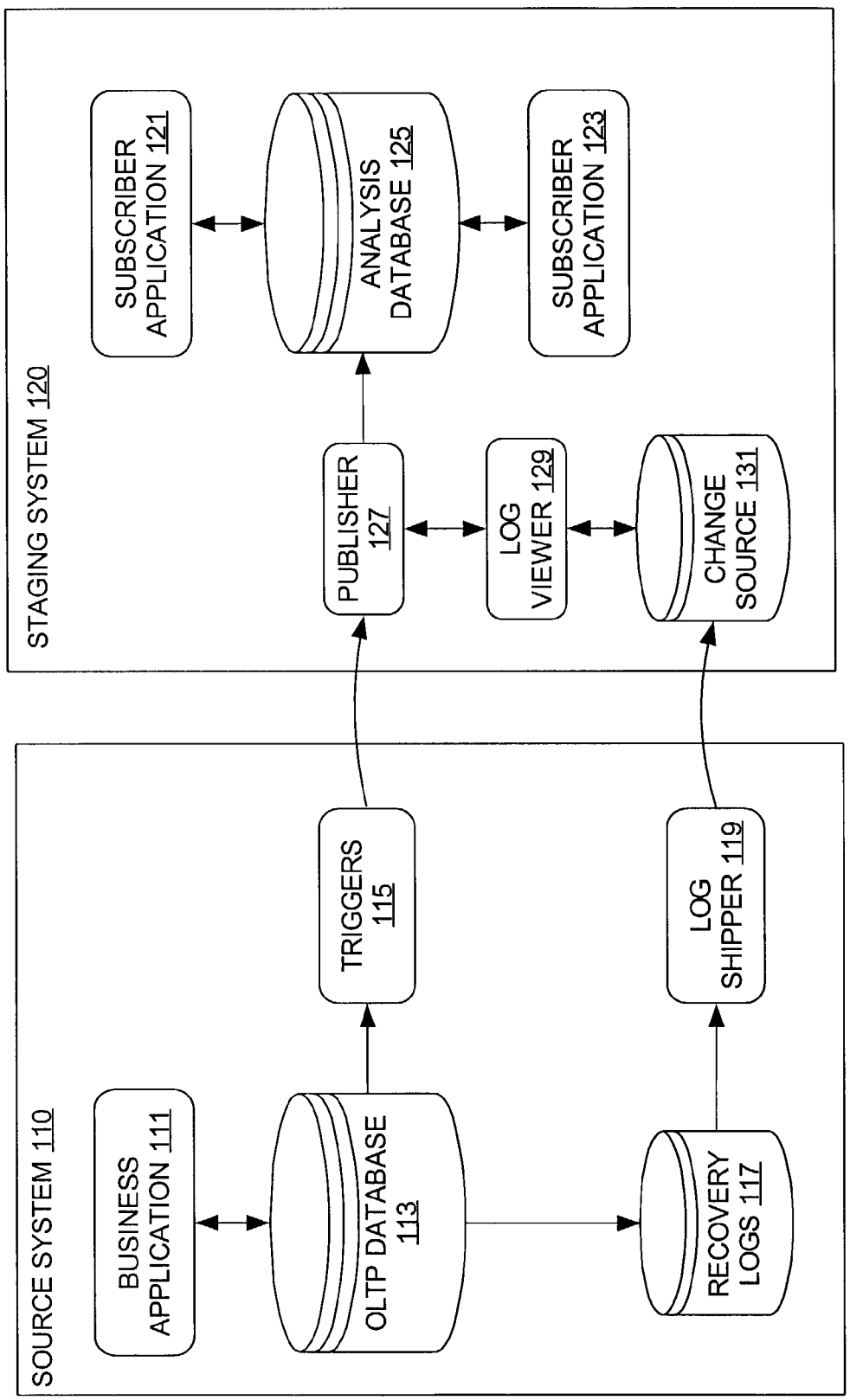
FIG. 1 is a high-level architectural diagram of one embodiment of the present invention.

FIG. 1 depicts the architecture of one embodiment of the present invention comprising a source system 110 and a staging system 120. The source system 110 is typically an on-line transaction processing (OLTP) for executing and keeping track of transactions for a business. For example, the source system 110 hosts a business application 111 that is responsible for interacting with employees or customers of the business. In response to commands and queries from the user of the business application 111, the business application 111 interacts with an OLTP database 113 for storing and retrieving data.

Functioning as the data warehouse in this example, the staging system 120 hosts one or more subscriber applications 121, 123. Without loss of generality, two subscriber applications 121, 123 are depicted, although any number may be created during the course of operation of an embodiment of the present invention. The subscriber applications 121, 123 are responsible for aggregating and analyzing the change data that has been extracted from the OLTP database 113, transported to the staging system 120, and loaded into the analysis database 125. Preferably, one of two mechanisms are employed to extract data from the OLTP database 113 without using flat files. These mechanisms are termed "synchronous extraction" and "asynchronous extraction," respectively.

In the synchronous extraction mechanism, triggers 115 are employed to capture each change to the OLTP database 113 when the changes are made and transport the changes to the staging system 120. At the staging system 120, these changes are then integrated and loaded into change tables (not shown) of the analysis database 125 by a publisher process 127. The synchronous extraction mechanism is described in greater detail in the commonly assigned, co-pending U.S. patent application Ser. No. 09/863,422 entitled "Synchronous Change Data Capture in a Relational Database" filed on May 24, 2001 by William D. Norcott, the contents of which are hereby incorporated by reference.

For the asynchronous extraction mechanism, a log shipper 119 periodically copies recovery logs 117 that are produced by the OLTP database 113 in the normal course of operation. The recovery logs 117 contain all the changes that have been applied to the OLTP database 113 and are used for backing up the data in the OLTP database 113 and restoring the data in case of a system crash. The log shipper 119 copies the recovery logs 117 to an area of the staging system 120 called a change source 131, which can be implemented as an operating system directory. The publisher 127 interacts with a log viewer process 129 to obtain the change data from the shipped recovery logs in the change source 131 without having to be aware of the internal implementation details of the recovery logs. The publisher 127 then loads the change data obtained via the log viewer process 129 into the change tables in the analysis database 125. The asynchronous extraction mechanism is described in greater detail in the commonly assigned, co-pending U.S. patent application Ser. No. 09/863,419 entitled "Asynchronous Change Capture for Data Warehousing" filed on May 24, 2001 by William D. Norcott, the contents of which are hereby incorporated by reference.

Objects for Managing Change Data

In accordance with one aspect of the present invention, the change data extracted from the OLTP database 113 is maintained not in a flat file but in one or more database objects, referred to herein as "change tables" under control of a database management system, e.g. analysis database 125. Because the database management system provides such features as crash recovery for security and indexing for performance, use of database objects to hold the change data advantageously attains these beneficial features, without additional programming as compared to use of flat files.

Figure 2:
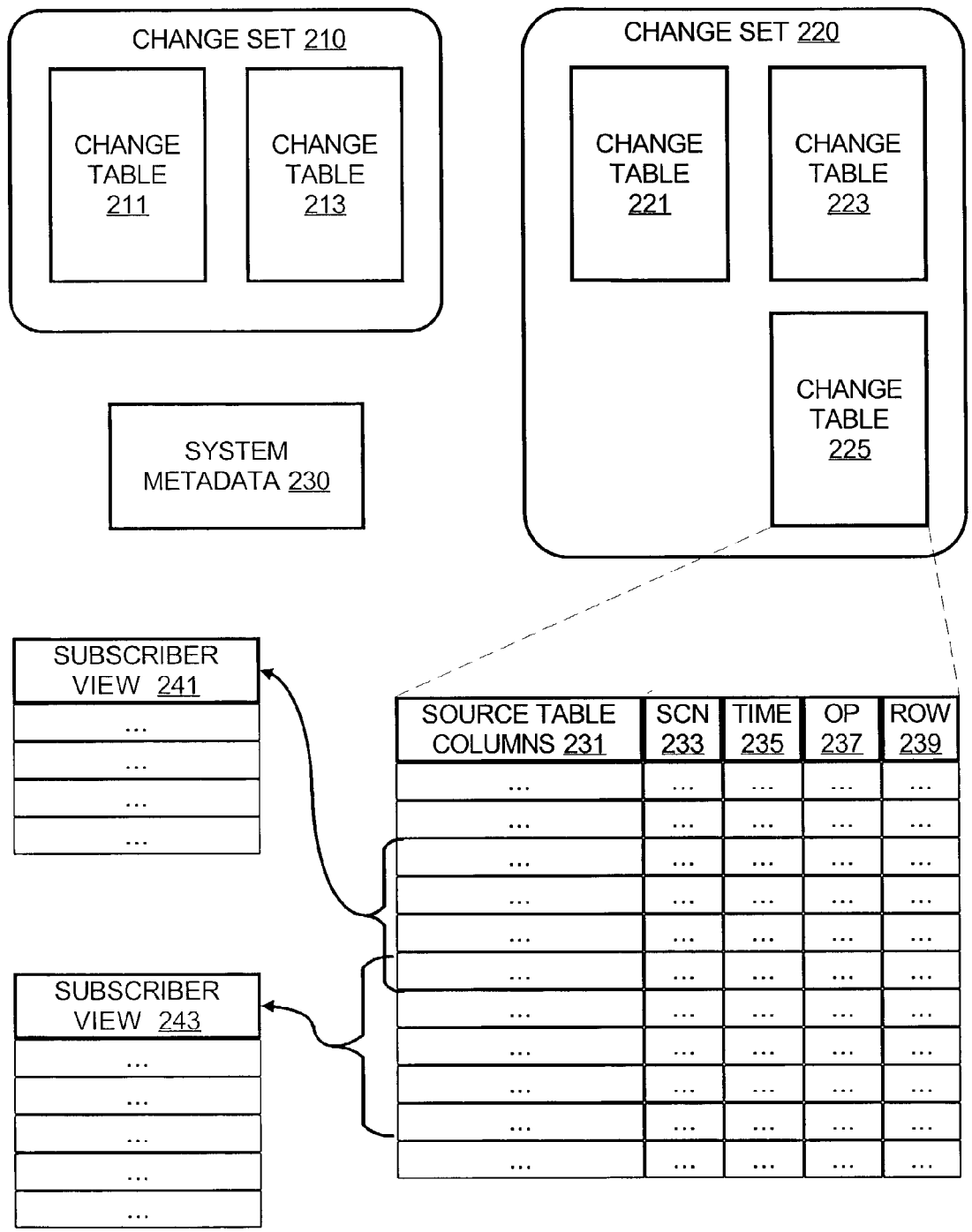
FIG. 2 is a schematic diagram depicting change objects in accordance with one embodiment of the present invention.

Referring to FIG. 2 by way of example, each source table or database object on the OLTP database 113 that is subject to change data capture is associated with a corresponding change table 211, 213, 221, 223, 225 in the analysis database 125. For transactional consistency, change tables 211, 213, 221, 223, 225 are grouped into sets of one or more "change sets" 210, 220 such that the publisher 127 ensures that all new change data added to the change tables in the same change set (e.g. change tables 211, 213 of change set 210) are added at the same time, e.g. the modifications to these changes tables are performed in the same transaction and committed. In the example depicted in FIG. 2, there are two change sets, change set 210 and change set 220. Change set 210 comprises change table 211 and change table 213, which correspond to respective tables (not shown) on the OLTP database 113. Likewise, change set 220 comprises change table 221, change table 223, and change table 225, which also correspond to respective tables (not shown) on the OLTP database 113. The information that defines the structure of the change sets 210, 220 and change tables 211, 213, 221, 223, 225 is maintained in system metadata 230.

Each change table employs a number of control columns in addition to the source table columns whose values were extracted, transported, and loaded from columns of the corresponding source table in the OLTP database 113. In the example of FIG. 2, change table 225 is depicted as having a set of source table columns 231 and control columns SCN 233, TIME 235, OP 237, and ROW 239. The source table columns 231 may include all or a subset of the columns in the corresponding source table. In various implementations, the control columns may be part of the same database object that contains the source table columns or part of parallel, associated database objects, which can be joined with source table columns (e.g. by a row identifier or a primary key).

The control columns SCN 233, TIME 235, OP 237, and ROW 239 preferably have reserved names that customers are not allowed to use for their own columns, for example, names with a reserved character such as a dollar sign ($). The reserved names, of course, can be any valid string and, in this example, are named SCN 233, TIME 235, OP 237, and ROW 239 for mnemonic reasons.

The SCN 233 column holds the System Change Number of the commit for the transaction on the OLTP database 113 that gave rise to the change data. A system change number is a monotonically increasing number that identifies every operation performed on a database system, e.g. update, insert, delete, and commit, that can be used to order the operations performed in the database system. The present invention is not limited to any particular implementation of system change numbers, and the concepts disclosed herein may be profitably employed with timestamps, incrementing serial numbers, and the like.

The TIME 235 column contains the commit time of the transaction that gave rise to the change data. This column helps subscriber applications 121 select or view change data that occurs in particular periods of time.

The OP 237 column contains a code indicating the type of operation that resulted in the change data. For example, if the OP 237 column contains the symbol 'I', then the operation was an insert operation and the change data in the source table columns 231 contains the data that was inserted. If the OP 237 column contains the symbol 'D', then the operation was a delete operation and the change data in the source table columns 231 contains the data that was deleted (this allows the summaries to be properly readjusted by the subscriber applications 121). If the OP 237 column contains the symbol 'UO', then the operation was an update operation and the change data in the source table columns 231 contains the old data that was modified; likewise, if the OP 237 column contains the symbol 'UN', then the operation was an update operation and the change data in the source table columns 231 contains the new data that was modified. Thus, update operations on the source table result in two entries in the change table, one for the old data and another for the new data, so the subscriber applications 121 have sufficient information to readjust their summaries of the OLTP data. Under certain circumstances, the source table may include "large objects" (LOB) such as graphics and pictures. This LOB is typically not summarized, so, to save memory, only the new LOB is recorded in the change table (with the symbol 'UL' in the OP 237 column). These symbols in the OP 237 column ('I', 'D', 'UO', 'UN', 'UL') are chosen for mnemonic reasons and other symbols can be arbitrarily assigned any unique value without departing from the purview of the present invention (e.g. numbers).

The ROW 239 column contains a unique row sequence number for the changes in the change table. This column helps subscriber applications 121 order the operations that have been committed in the same transaction. Also, both the record for the old updated values (OP 237 column with 'UO') and the record for the new updated values (OP 237 column with 'UN') of the same operation will have the same row sequence number, because these two records are for the same change operation on the OLTP database 113 (an update operation).

Although not depicted in FIG. 2, additional control columns may be provided to facilitate the implementation of embodiments of the present invention. For example, a bit mask of the updated columns can be used to identify quickly which columns have changed. As another example, the name of user who caused the operation can be recorded in a control column. The row identifier of the affected row in the source table can also be included in a control column.

The subscriber applications 121, 123 of FIG. 1, however, need not see all the contents of the change tables. In particular, the range of rows that the subscriber applications 121, 123 see in the respective subscriber view is restricted and carefully controlled, as explained in detail below, so that change data is not lost nor double counted for subscriber applications 121, 123. In the example of FIG. 2, two subscriber views 241, 243 are depicted although any number of subscriber views may be created during the operation of an embodiment of the present invention. Use of the subscriber views 241, 243 beneficially insulates the respective subscriber applications 121, 123 from the implementation details of the change table 225. Unlike some prior art approaches, it is not necessary to add any control columns or information to the source tables themselves on the OLTP database 113; the provision of control columns for the change tables on the analysis database 125 suffices. Consequently, this feature allows change data capture to be performed without changing the schema of the OLTP database 113, which is desirable for many turn-key OLTP databases.

Publication

In one embodiment of the present invention, a publication-subscription model is employed to manage the captured change data. The publisher 127 of FIG. 1 may be implemented as a suite of related programs and a user interface intended for use by a database administrator or person with similar privileges to administer the database. FIG. 3 illustrates the various publication operations that may be performed by the publisher 127. Publication involves the creation and maintenance of the change tables (elements 211, 213, 221, 223, 225 of FIG. 2), the logical grouping of change tables in change sets (elements 210, 220 of FIG. 2), the creation and maintenance of change sources 131, which can be implemented as database objects that represent the database systems that are sources of the change data, and mechanisms for synchronous and asynchronous data capture. Furthermore, publication also involves a mechanism for limiting the disk storage used by change tables so that the change tables do not grow without limit but that the contents of the change tables are deleted when no longer required by a subscriber application 121, 123.

At step 301, the publisher creates one or more change sources 131 and records that information in system metadata 230. Each change source uniquely identifies a source of change data. For example, change data originating from the city of Boston could be represented by creating a change source with the name of BOSTON, while change data originating from Chicago could be represented by a change source named CHICAGO. The staging system 120 may contain a plurality of change sources. In a preferred embodiment of the present invention, a change source is either synchronous or asynchronous. The value of an asynchronous change source identifies the location (e.g. pathname to an operating system directory) of shipped recovery logs for that change source. Because change tables are updated in response to trigger events under synchronous change data capture without the use of recovery logs, the change source for synchronous change data capture is typically an arbitrary name such as SYNC_SOURCE to indicate that it is not necessary to specify any location for recovery logs.

At step 303, one or more change sets 210, 220 are created for each change source 131 and that information is recorded in system metadata 230. Change sets 210, 220 can be used for at least two independent purposes: to maintain transactional consistency and to segregate change data according to the commit time of the individual transactions. Transactional consistency is achieved when all the updates to a related group of change tables are committed in the same transaction. Thus, change sets 210, 220 permit the publisher to identify such logically related change tables. Change sets 210, 220 can also have a begin date and an end date, such that all change tables in the change sets 210, 220 store change data only from transactions that fall between the begin date and the end date. For example, a change set CHICAGO_JUNE may be created with a begin date of Jun. 1, 2000 and an end date of Jun. 30, 2000. Thus, all the change data from the CHICAGO change source that falls within the month of June 2000 is stored in those change tables that belong to the CHICAGO_JUNE. The begin date and the end date may be stored in system metadata tables, and either date may be open ended to permit partially or completely unbounded time periods. Each of the change sets may capture changes for a time period that has different begin or end dates with respect to another change set, even when the change sets refer to the same source tables in the same change source. Accordingly, this feature provides great flexibility in time periods that is independent and unaffected by the time periods of other change sets.

At step 305, the publisher next creates the change tables 211, 213, 221, 223, 225, assigns each of the change tables 211, 213, 221, 223, 225 to one of the change sets 210, 220, and records that information in system metadata 230. Each of the change tables 211, 213, 221, 223, 225 shares the same begin and end dates of the corresponding change sets 210, 220 to which the change table belongs. Furthermore, the change tables in the same change set are maintained in a transactionally consistent manner. For example, suppose a change source (e.g. a set of shipped recovery logs) contains the change data for the changes that occurred on June 15. Then, when the data in the change set is captured, each of the change tables in the change set is updated to reflect the changes that were made to the corresponding source tables on June 15. Specifically, there will never be the situation where one change table in a change set contains only the changes through June 11 and another change table in the same change set contains the changes up until June 14, etc.

After the change objects have been created, change data is periodically added to the change tables (step 307) and deleted from the change tables (step 309). More specifically, as asynchronous change data is transported to the change source 131 on the staging system 120, the publisher 127 periodically "advances" a change set. Advancing a change set involves processing the shipped recovery logs in the change source 131. In one asynchronous implementation, a SQL SELECT statement is issued to a log viewer 129 process, which returns the change data for a particular range of time for insertion into the appropriate change tables of the change set. Change data is deleted from the change tables in response to purge commands from subscriber applications 121, 123. Specifically, a low watermark is maintained for each change table to keep track of the oldest row of change data that has not yet been purged by a subscriber application 121, 123. The operation of the advance and delete operation (steps 307, 309) is described in more detail herein below in relation to a working example.

Subscription

In accordance with the publication-subscription model, subscription includes mechanisms for a subscriber application 121, 123 to request access to change data in a controlled fashion, e.g. in commit order and without data loss or double counting; to coordinate between subscriber applications 121, 123 so that multiple subscribers application 121, 123 can share a given change table; to allow multiple subscriber applications 121, 123 to read or reread the same rows of change data in the change tables as needed without regard to the sudden appearance of new data being captured in the change tables; and to notify the publisher when the subscribers application 121, 123 are finished with rows of change data so that the publisher can efficiently and correctly remove rows of change data.

Referring now to FIG. 4, which illustrates the operation of one implementation, a subscriber application 121, 123 registers with the publisher 127 a request to become a subscriber of the change data, e.g. to access the change data in a controlled manner (step 401). A subscriber application 121, 123 may subscribe to a plurality of change tables that belong to the same change set. In addition, the subscriber application 121, 123 can specify one or more of the source table columns that are of interest. For example, if the change table contains source table columns A, B, C, D, a subscriber may choose to subscribe to only columns B, C omitting columns A, D.

In response to registering a subscription request with the publisher 127, the subscriber application 121, 123 is ready to access rows of change data. All of the requests for change data by the subscriber application 121, 123 is mediated through a respective "subscription window". A subscription window presents one or more rows of change data that include every row of change data between an oldest or earliest change row and a newest or latest change row, without exception. The extent of the change data that belongs to the subscription window is governed by an extend subscription window call, which the subscriber application 121, 123 makes (step 403).

In response to the extend subscription window call, the publisher 127 moves the subscription window further into the direction of the future such that one or more never-seen-before (with respect to the subscriber application) rows of change data are made available to the subscriber. In order to view the change rows, the subscriber application 121, 123 makes a prepare subscriber view call (step 405), which instantiates a relational view 241, 243 that contains all the change rows that are contained in the subscription window. In order to use the change data in the subscriber view 241, 243, the subscriber application 121, 123 can issue a SQL SELECT statement such as "SELECT * FROM SUBSCRIBER_VIEW ORDER BY SCN$" where SUBSCRIBER_VIEW is a name or alias of the subscriber view 241, 243. In response, the change data is returned, and the subscriber application 121, 123 accordingly processes the data (step 407).

To indicate that the subscriber application 121, 123 is finished with the data in the subscriber window, the subscriber application 121, 123 makes a drop window call (step 409), followed by a purge window call (step 411). The purge window call of step 411 informs the publisher 127 that the change rows are no longer required by the subscriber application 121, 123, so that, when all of the subscriber applications 121, 123 have so signaled, the publisher 127 can delete any change rows that are no longer of use to any subscriber application 121, 123, thereby preventing the change tables from growing without limit. If the query is reissued before the subscriber application 121, 123 makes an extend window call (step 403) or a purge window call (step 411), then the same set of change rows is returned to the subscriber application 121, 123. Consequently, because different change rows are only returned to the subscriber application 121, 123 after an affirmation action on the part of the subscriber application 121, 123, e.g. the extend window call (step 403) or the purge window call (step 411), the subscriber application 121, 123 can avoid double-counting change data and missing change data, respectively.

WORKING EXAMPLE

FIGS. 5A, 5B, 5C, 5D, 5E, and 5F show a sequence of phases of a working example that illustrates how one embodiment of the publication-subscription model operates. In FIG. 5A, a change table 500 contains four rows 501, 502, 503, 504 of change data. A first subscriber application 121 activates a subscription to change table 500 (step 401), extends the subscription window to the present (step 403), and obtains a subscriber view 510 (step 405). Accordingly, the first subscriber application 121 is able to process the four rows 501, 502, 503, 504 (step 407).

Next, in FIG. 5B, additional change data, comprising rows 505, 506, arrives and is added to the change table 500 (step 307). Because the first subscriber application 121 is currently working with the subscriber 510 based on its subscription window, the first subscriber application 121 does not see the additional change data 505, 506 in the change table 500. Thus, the first subscriber application 121 is free to make as many SELECT calls as necessary without having to worry about new change data appearing without warning, thereby avoiding the double counting problem. Meanwhile, a second subscriber application 123 activates a subscription to change table 500 (step 401), extends the subscription window to the present (step 403), and obtains a subscriber view 520 (step 405). Accordingly, the second subscriber application 123 is able to process the six rows 501, 502, 503, 504, 505, 506 (step 407).

In FIG. 5C, additional change data, comprising rows 507, 508, arrives and is added to the change table 500 (step 307). Neither the first subscriber application 121 nor the second subscriber application 123 sees this additional change data 507, 508 in the change table 500, because this additional change data 507, 508 is not part of the first subscriber view 510, 520, respectively.

In FIG. 5D, the first subscriber application 121 is finished processing the change data 501, 502, 503, 504, and therefore drops the subscriber view 510 (step 409), purges the subscriber window, which contains change rows 501, 502, 503, 504 (step 411), extends the subscription window to the present (step 403), and obtains a new subscriber view 511 (step 405). This subscriber view 511 contains change rows 505, 506, 507, 508, which were not part of the original subscriber view 510. Because the rows 501, 502, 503, 504 purged by the first subscriber application 121 are still being used by the second subscriber application 123, these rows 501, 502, 503, 504 are not deleted.

In FIG. 5E, the second subscriber application 123 is finished processing the change data 501, 502, 503, 504, 505, 506 and therefore drops the subscriber view 520 (step 409), purges the subscriber window, which contains change rows 501, 502, 503, 504, 505, 506 (step 411), extends the subscription window to the present (step 403), and obtains a new subscriber view 521 (step 405). This subscriber view 521 contains change rows 507, 508, which were not part of the original subscriber view 520.

Change rows 501, 502, 503, 504, which were purged by the second subscriber application 123, are no longer being used by the any subscriber application; therefore, these rows 501, 502, 503, 504 are deleted, resulting in the phase depicted in FIG. 5F. Because these rows 501, 502, 503, 504 are deleted only in response to a purge window call by a subscriber application, subscriber applications 121, 123 are free to make as many SELECT calls as necessary without having to worry about current change data disappearing without warning, thereby avoiding the data loss problem. On the other hand, because the rows 505, 506, are still being used by the first subscriber application 121, these rows 505, 506 are not deleted.

Hardware Overview

Figure 6:
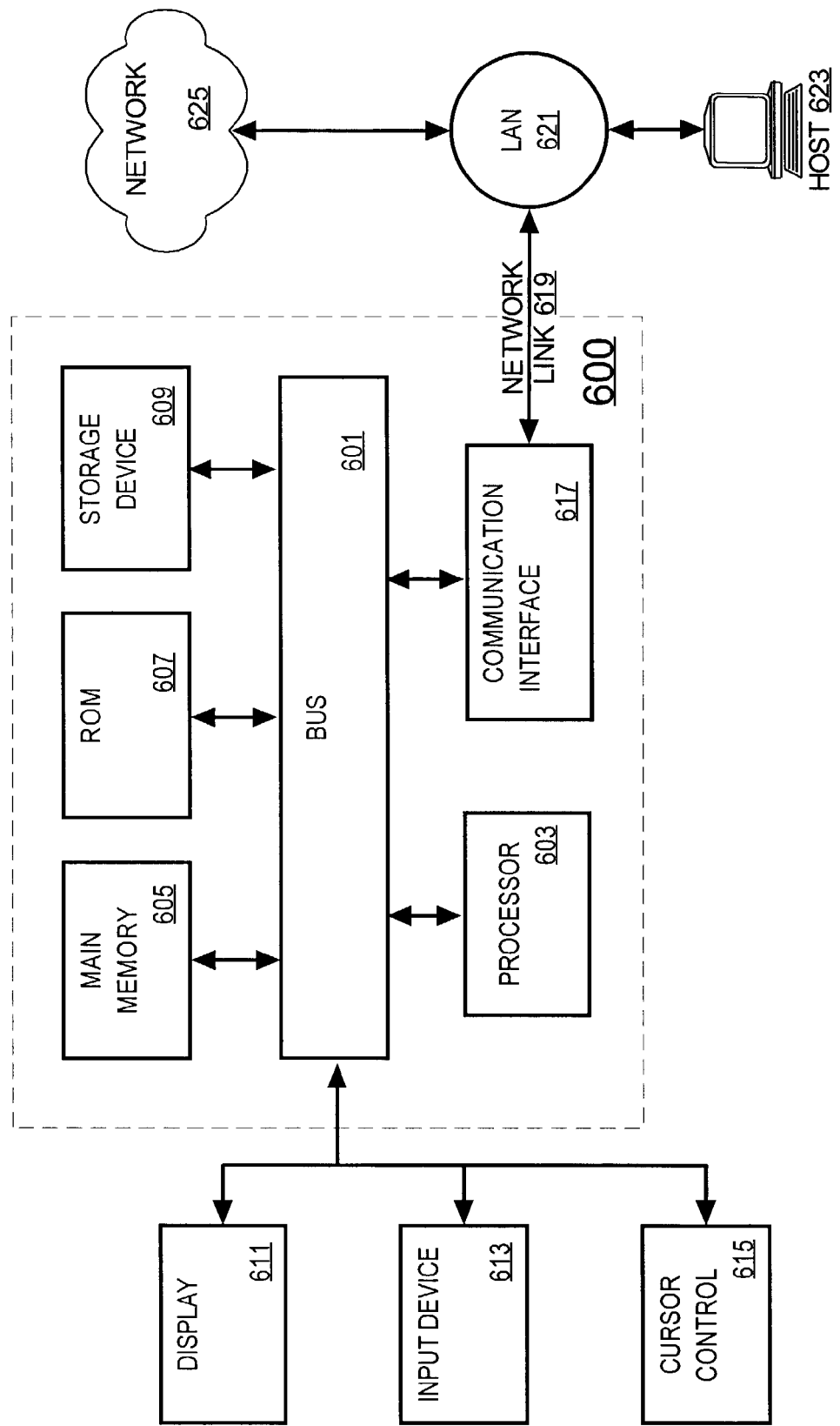
FIG. 6 depicts a computer system that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, change data capture is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging to an application program for implementing an embodiment of the present invention through the network 625, local network 621 and communication interface 617. The processor 603 may execute the transmitted code while being received and/or store the code in storage device 609, or other non-volatile storage for later execution. In this manner, computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on a storage device either before or after execution by processor.

CONCLUSION

While the present invention has been described in connection with a number of embodiments and implementations, the present invention is not so limited but covers various obvious modifications and equivalent arrangements, which fall within the purview of the appended claims.

What is claimed is:

1. A computer-implemented method for managing change data captured from a database system, comprising:
   maintaining a database object that corresponds to a source object of the database system, said database object containing change data that indicates at least one modification that has been performed to the source object;
   defining, with respect to an application, a window of change data that includes all the change data in the database object that was committed between a first point in time and a second point in time;
   in response to a query from the application, presenting only the change data from the database object that is included in the window;
   after said defining the window, adding new change data to the database object from the source object;
   extending the window to include the new change data; and
   presenting the new change data from the database object only after extending the window.

2. A method according to claim 1, wherein the database object comprises a change table.

3. A method according to claim 1, further comprising associating the change table with a group of change tables.

4. A method according to claim 3, further comprising maintaining the group of change tables such that each of the change tables in the group includes change data only between a period of time.

5. A method according to claim 3, further comprising maintaining transactional consistency for the change table in the group.

6. A method according to claim 3, further comprising maintaining another group of change tables, wherein one of the change tables in the other group corresponds to the source table.

7. A method according to claim 1, wherein the step of defining the window includes extending the window by moving the second point in time forward.

8. A method according to claim 1, wherein the step of defining the window includes purging the window by moving the first point in time to be coincident with the second point in time.

9. A method according to claim 1, wherein the modification includes one of an insert, a delete, and an update of a record of the source object.

10. A computer-readable storage medium bearing instructions for managing change data captured from a database system, said instructions being arranged, upon execution, to cause one or more processors to perform the steps of a method according to claim 1.

11. A method according to claim 1, wherein said maintaining the database object provides crash recovery for the database system.

12. A method according to claim 1, wherein said maintaining the database object provides indexing for the database system.

13. A computer-implemented method for managing change data captured from a database system, comprising:
   maintaining a database object that corresponds to a source object of the database system, said database object containing change data that indicates at least one modification that has been performed to the source object;
   defining, with respect to a plurality of applications, respective windows of change data that includes all the change data in the database object that was committed between respective first points in time and respective second points in time; and
   in response to respective queries from the applications, presenting only the change data from the database object that is included in the respective windows;
   wherein the step of defining the windows includes:
   purging a plurality of windows in response to respective purge requests from the respective applications by moving the respective first points in time to be coincident with the respective second points in time; and deleting records of change data in the database object that occur before the earliest of the first points in time.

14. A method according to claim 13, wherein at least one of the first points in time or the second points in time differs from another of first points in time or the other second points in time, respectively.

15. A computer-readable medium bearing instructions for managing change data captured from a database system, said instructions being arranged, upon execution, to cause one or more processors to perform the steps of a method according to claim 13.

16. A method according to claim 13, wherein the database object comprises a change table.

17. A method according to claim 13, wherein said maintaining the database object provides crash recovery for the database system.

18. A method according to claim 13, wherein said maintaining the database object provides indexing for the database system.

* * * * *